(12) United States Patent
Freeman (10) Patent No.: US 6,299,063 B1
(45) Date of Patent: Oct. 9, 2001

(54) METHOD AND APPARATUS FOR AUTOMATED DATA ENTRY

(75) Inventor: Mitchell B. Freeman, San Jose, CA (US)

(73) Assignee: Impresse Corporation, Sunnyvale, CA (US)

( * ) Notice: Subject to any disclaimer, the term of this patent is extended or adjusted under 35 U.S.C. 154(b) by 0 days.

(21) Appl. No.: 09/205,062

(22) Filed: Dec. 4, 1998

(51) Int. Cl.$^7$ .................................................. G06K 7/10
(52) U.S. Cl. ....................... 235/462.01; 235/375; 235/470
(58) Field of Search ................................ 235/375, 462.01, 235/462.13, 462.15, 470, 487, 494; 358/443

(56) References Cited

U.S. PATENT DOCUMENTS

| | | |
|---|---|---|
| 3,703,725 | 11/1972 | Gomersall et al. |
| 3,818,191 * | 6/1974 | Fennema et al. ................. 235/494 X |
| 4,796,194 | 1/1989 | Atherton. |
| 4,850,009 * | 7/1989 | Zook et al. ....................... 235/375 X |
| 5,229,948 | 7/1993 | Wei et al. |
| 5,260,553 * | 11/1993 | Rockstein et al. ............... 235/462.01 |
| 5,287,203 * | 2/1994 | Namizuka ........................... 358/443 |
| 5,291,397 | 3/1994 | Powell. |
| 5,432,887 | 7/1995 | Khaw. |
| 5,463,555 | 10/1995 | Ward et al. |
| 5,684,288 * | 11/1997 | Renvall ............................. 235/462.15 |
| 5,794,207 | 8/1998 | Walker et al. |
| 6,036,095 * | 3/2000 | Seo .................................. 235/472.01 |

FOREIGN PATENT DOCUMENTS

| | | |
|---|---|---|
| 0 517 953 A2 | 12/1992 | (EP). |
| 8-329175 * | 12/1996 | (JP). |
| 09034953 | 2/1997 | (JP). |
| 11110451 | 4/1999 | (JP). |
| WO 96/10793 | 4/1996 | (WO). |
| WO 96/16365 | 5/1996 | (WO). |
| WO 97/07472 | 2/1997 | (WO). |
| WO 97/28506 | 8/1997 | (WO). |
| WO 97/29441 | 8/1997 | (WO). |
| WO 97/31322 | 8/1997 | (WO). |

OTHER PUBLICATIONS

PCT International Search Report; International Application No. PCT/US99/24177; Apr. 6, 2000.
PCT International Search Report; International Application No. PCT/US99/24178; Apr. 6, 2000.
PCT International Search Report; International Application No. PCT/US99/24381; Feb. 29, 2000.
PCT International Search Report; International Application No. PCT/US99/24193; Feb. 5, 2000.
PCT International Search Report; International Application No. PCT/US99/24131 Dec. 4, 1998.
PCT International Search Report; International Application No. PCT/US 24132; Feb. 22, 2000.
"A Knowledge Based, Integrated Process Planning and Scheduling System for Document Preparation"; Roger M. Kerr; XP–000892975; pp. 497–506, 1991 (No month).
"Heuristic Knowledge Representation of Production Scheduling: An Integrated Modeling Approach"; Sung Joo Park and Jong Woo Kim; XP–000893055; pp. 325–339, 1996 (No month).

(List continued on next page.)

Primary Examiner—Michael G. Lee
Assistant Examiner—Jared J. Fureman
(74) Attorney, Agent, or Firm—Blakely Sokoloff Taylor Zafman LLP (57) ABSTRACT

Bar code data may be automatically inserted into an associated data field by first determining whether bar code data has been received, and, if so, matching a field code included with the bar code data to the associated data field. Subsequently, the bar code data may be inserted into the associated data field.

13 Claims, 7 Drawing Sheets

OTHER PUBLICATIONS

"From Contemporary Workflow Process Automation to Adaptive and Dynamic Work Activity Coordination and Collaboration"; Amit Sheth; XP–002135795 pp. 24–27, 1997 (No month).

Towards Evolutionary and Adaptive Workflow Systems—Infrastructure Support Based on Higher–Order Object Nets and CORBA; Ingo ClaBen, Herbert Weber and Yanbo Han; XP–002135793; pp. 300–308, 1997 (no month).

"A Fine Mes"; State of the Art; Jim Esch; Petersborough, NH, US; No. 12; pp. 67, 68, 70, 74, 75, Dec. 1995.

"Simulation System for Real–Time Planning, Scheduling, and Control"; Glenn R. Drake and Jeffrey S. Smith; pp. 1083–1090, Aug. 1996.

"Electronic Contracting with COSMOS–How To Establish, Negotiate and Execute Electronic Contracts on the Internet"; F. Griffel, M. Boger, H. Weinrcich, W. Lamersdorf and M. Merz; XP–002129707; pp. 46–55, Mar. 1998.

* cited by examiner

METHOD AND APPARATUS FOR AUTOMATED DATA ENTRY

FIELD OF THE INVENTION

The present invention relates to data entry in a computer or other system; more particularly, the present invention relates to automatically entering bar code data obtained from a bar code into associated data fields of a database or other data store.

BACKGROUND

Bar codes allow for the sophisticated management of almost anything, without the traditional man hours usually required to gather information. For example, bar codes may be used to track assets in buildings, manage vehicle fleets, track the delivery of mail within various locations within an office, etc. A bar code is the combination of black and white lines that contains character information. The character information in bar codes may be read with specialized reading devices and subsequently passed on to a computer or other device (e.g., cash registers and other appliances). Various types of reading devices are used to obtain the data represented in bar codes, depending upon the application. One type of reading device that is used is a scanner. Scanners are generally equipped with laser diodes and a system of mirrors and lenses to scan the bar code and capture the reflection thereof.

Figure 1:
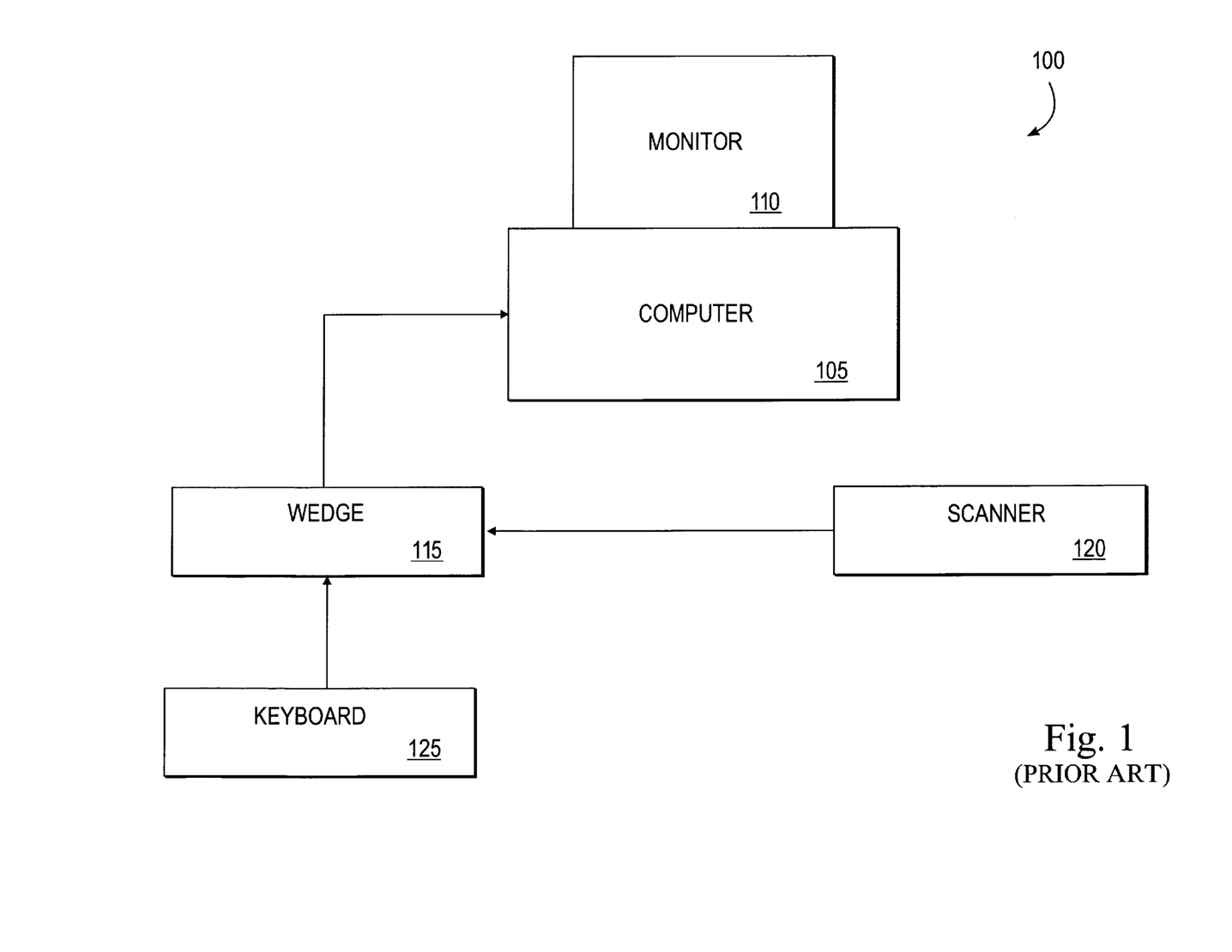
FIG. 1 illustrates a typical system used for bar code scanning applications.

One scanning method is so-called corded scanning. Corded scanning typically involves the use of a bar code scanner coupled to either a serial port or a keyboard of a computer. FIG. 1 illustrates a typical corded scanning system 100 that may be used for bar code reading applications. System 100 includes a computer 105, monitor 110, keyboard wedge 115, scanner 120 and keyboard 125. Keyboard wedge 115 is coupled between computer 105 and scanner 120 and keyboard 125. In essence, keyboard wedge 115 is an interface that permits the incorporation of bar code technology with data management systems (e.g., software packages) already in place in computer 105. Characters typed on keyboard 125 are received at keyboard wedge and transmitted to computer 105 in the familiar fashion. In addition, bar code character information scanned by scanner 120 is converted into keyboard keycodes by keyboard wedge 115 and subsequently transmitted to computer 105. Thus, computer 105 is not capable of distinguishing between characters received from scanner 120 or keyboard 125.

Figure 2:
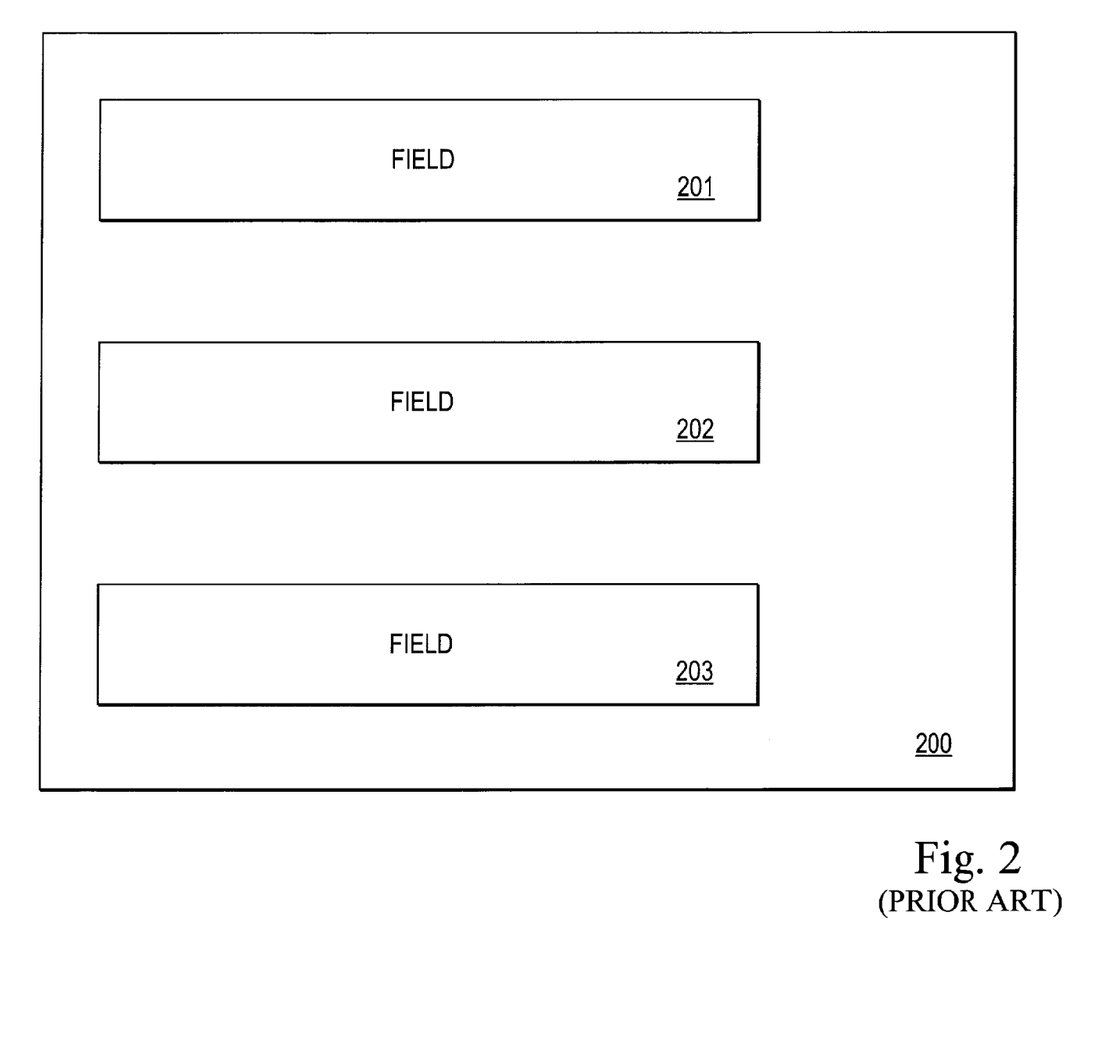
FIG. 2 illustrates an exemplary applications display for use in the system shown in FIG. 1.

FIG. 2 illustrates an exemplary applications display 200 that may be displayed on monitor 110. Display 200 includes data fields 201–203 that may be descriptions of data base fields. Data field 201 may, for example, be used to enter information regarding the job number of a particular database entry, while data fields 202 and 203 may be used to enter location and operator name information, respectively. User information may be entered into each of the data fields by scanner 120 or keyboard 125. For example, a user of system 100 may scan a bar code of an item using scanner 120 and have the character information associated with the bar code appear in either data field 201, 202 or 203.

One problem with system 100 is that character information from any bar code may be scanned into display 200. Thus, information from bar codes unrelated to the particular application used in system 100 may be scanned into data fields 201–203. It is therefore possible to scan a bar code on a milk container, for example, and have the information appear (improperly) as job number information in data field 201.

Another problem with system 100 is that it invites users to scan information into the wrong data field. The determination of which information is entered into which data field is dependent upon the location of a cursor within display 200. For instance, if a user scans a bar code label that contains job number information and the cursor is in data field 201, the job number character information is correctly entered into data field 201. However, if a user scans a bar code that contains operator name character information and the cursor is in data field 201, the operator name information is incorrectly entered into data field 201. Consequently, a user must always verify the location of the cursor before scanning a bar code in order to ensure that the cursor is placed in the proper data field. System 100 may therefore be impractical (due to its inherently high risk of error) in applications where hundreds, or thousands, of bar codes must be scanned in order to enter information into data fields.

SUMMARY OF THE INVENTION

According to one embodiment, the present invention provides a method of automatically inserting bar code data into a field in a computer database or other data store or display. The method includes determining whether bar code (or other) data has been received at the computer. If bar code data has been received at the computer, a field code included with the bar code data is matched with an associated data field. Subsequently, the bar code data is inserted into the associated data field.

BRIEF DESCRIPTION OF THE DRAWINGS

The present invention will be understood more fully from the detailed description given below and from the accompanying drawings of various embodiments of the invention. The drawings, however, should not be taken to limit the invention to the specific embodiments, but are for explanation and understanding only.

DETAILED DESCRIPTION

Figure 3:
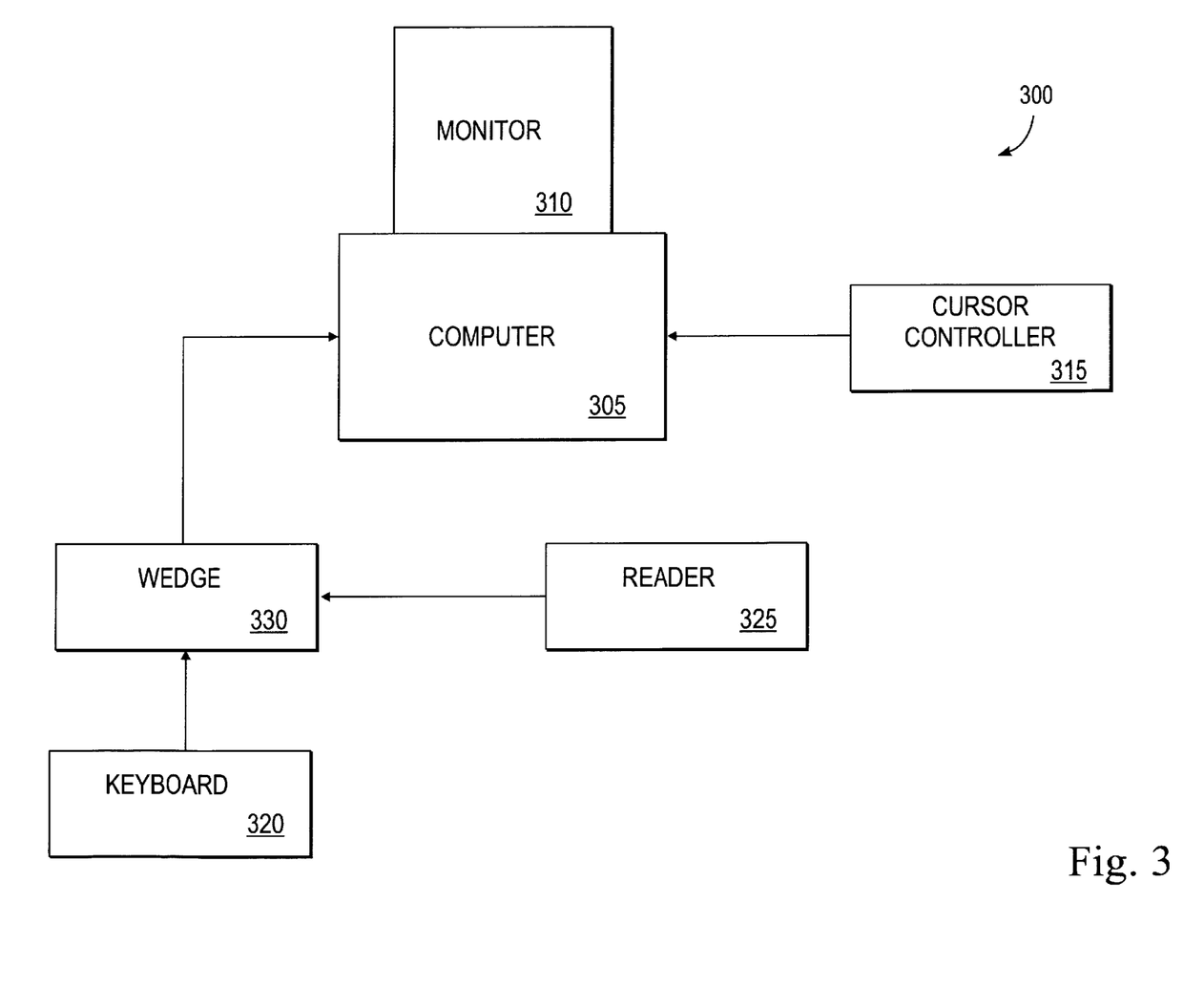
FIG. 3 illustrates a bar code scanning system configured in accordance with one embodiment of the present invention.

FIG. 3 illustrates a system 300 that may be used for bar code applications in accordance with the teachings presented herein. System 300 includes computer 305, monitor 310, cursor controller 315, keyboard 320, bar code reader 325 and a keyboard wedge 330. Computer 305 carries out data processing functions (e.g., processing of files, executing mathematical calculations, etc.) for system 300 according to instructions (e.g., software applications) provided thereto. Monitor 310 is coupled to computer 305 and is used to display text and graphics information. Cursor controller 315 is a pointing device that is used to control the location of a cursor on monitor 310. For example, cursor controller 315 may be a mouse. However, other pointing devices, such as a trackball or joystick, may also be used. Keyboard 320 is an input device coupled to computer 305 that includes a multitude of character keys. Keyboard 320 transmits characters to computer 305 whenever a character key is pressed.

Bar code reader 325 is a reading device used to read bar codes. Bar code reader 325 transmits character information (or data) to computer 305 through keyboard wedge 330 in the familiar fashion. Alternatively, system 300 may include multiple bar code readers 325 that transmit data to computer 305 in this fashion. In one embodiment, bar code reader 325 is a laser scanner. However, bar code reader 325 may also be implemented using other bar code reading devices, such as gun readers, light pens, cameras, etc.

Keyboard wedge 330 is coupled between computer 305 and keyboard 320 and bar code reader 325. Keyboard wedge 335 permits the incorporation of bar code technology with data management systems (e.g., software applications) already in place in computer 305. Characters typed on keyboard 320 are received at keyboard wedge 330 and transmitted to computer 305 as discussed above. Additionally, bar code characters read by bar code reader 325 are converted into keyboard keycodes and transmitted to computer 305 via keyboard wedge 330.

Figure 4:
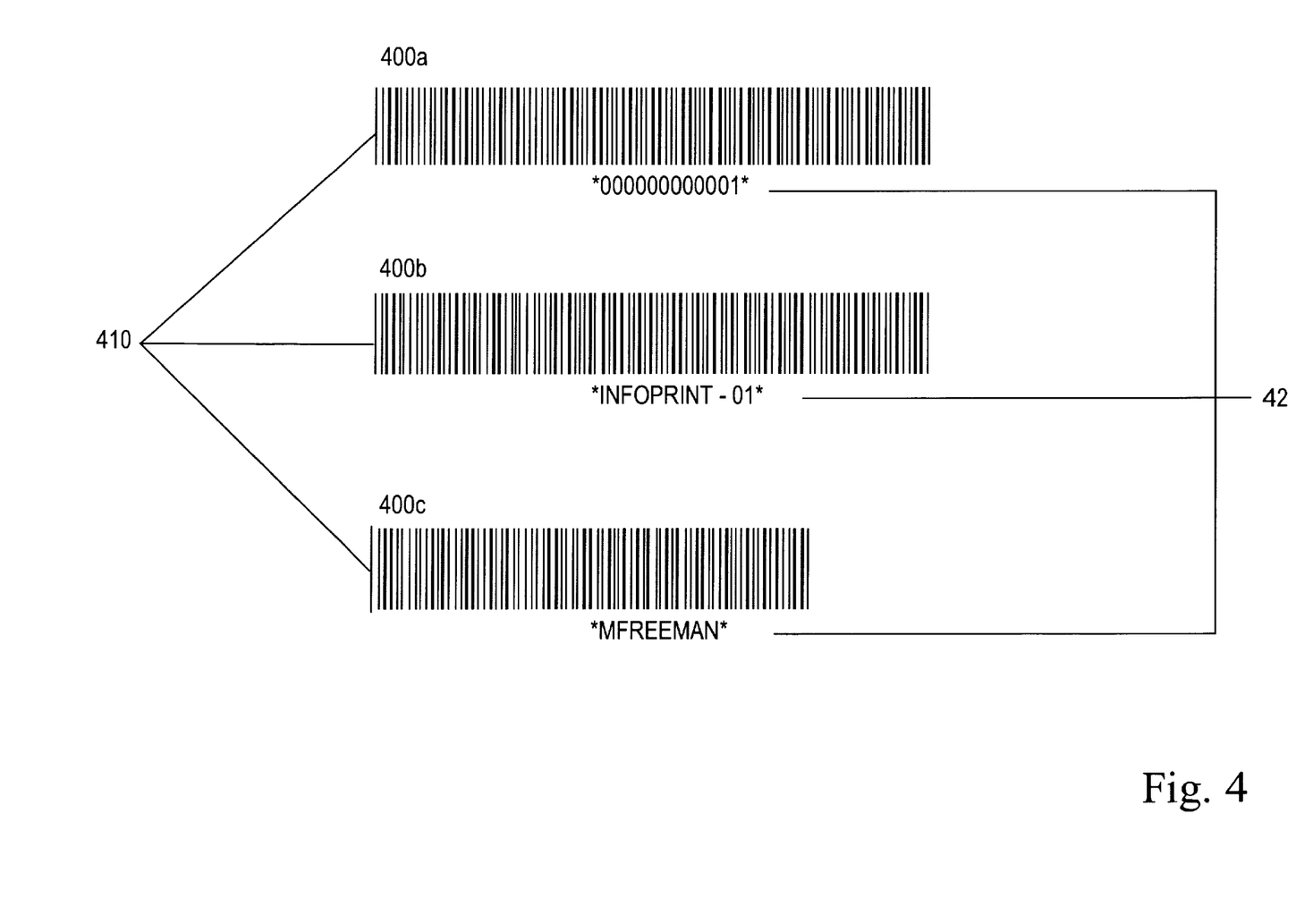
FIG. 4 illustrates bar codes adapted for use in accordance with various embodiments of the present invention.

FIG. 4 illustrates bar codes 400a–400c configured in accordance with one embodiment of the present invention. Bar codes 400a–400c each include character fields 410 and text identifiers 420. Text identifiers 420 identify the text characters that are included in character fields 410 using human readable alphanumeric characters. Bar codes 400a–400c are preferably implemented using Code 39. Code 39 is an alphanumeric code that includes digits from 0 to 9 and 26 capital letters. However, one of ordinary skill in the art will appreciate that the present invention may be implemented using other codes such as Code 128, EAN 128, ISBN, etc.

In addition to data, each character field 410 includes a fact field. A fact field consists of characters that are physically a part of a bar code 400, but do not show up in text identifier 420. The fact field is a five (5) character field that may be used to indicate a data field of an entry stored within a database in computer 305 and/or displayed on monitor 310. The fact field is, in essence, a pre-fix code of character field 410 that identifies the type of information that follows. For instance, if bar code 440a were read by bar code reader 325, the character field would include "/JOB/000000000001". The character fields of bar codes 440b and 440c would include "/LOC/INFOPRINT-01" and "/OPR/MFREEMAN/", respectively. The fact field entry /"JOB"/indicates that the following data in character field 410 represents a job number; /"LOC"/indicates that the following data in character field 410 represents a location; and /"OPR"/indicates that the following data in character field 410 represents an operator name. One of ordinary skill in the art will recognize that additional fact field codes may be used and other formats may be used to implement the fact field concept. Further, other combinations, as well as a different number of characters, may be used to implement the fact field code.

For one embodiment of the present invention, bar code reader 325 is configured to transmit bar code data to computer 305 only after recognizing a particular fact field code. If bar code reader 325 does not recognize the fact field code in a character field, or the bar code does not include a fact field, the bar code is ignored. Consequently, information from bar codes unrelated to a particular application will not be transmitted to computer 305.

For another embodiment of the present invention, bar code reader 325 is configured to transmit an initialization character (IC), an identifier code (ID) and termination character (TC) to computer 305 along with the bar code data. IC is transmitted as an indication to computer 305 that bar code data is being transmitted. IC is implemented using the "/" character. ID is a code that identifies the bar code reader 325 that transmitted the bar code data if system 300 includes more than one bar code reader 325. For example, system 300 may include ten (10) bar code readers 325 (or more or fewer bar code readers) having ID's 01, 02, 03, etc. The ID information may be stored in a database with the bar code data. TC is transmitted as an indication to computer 305 that the transmission of bar code data has been completed. TC is implemented using the "//" character. One of ordinary skill in the art will appreciate that one or more alternative characters may be used to implement IC, ID and EC.

Figure 5:
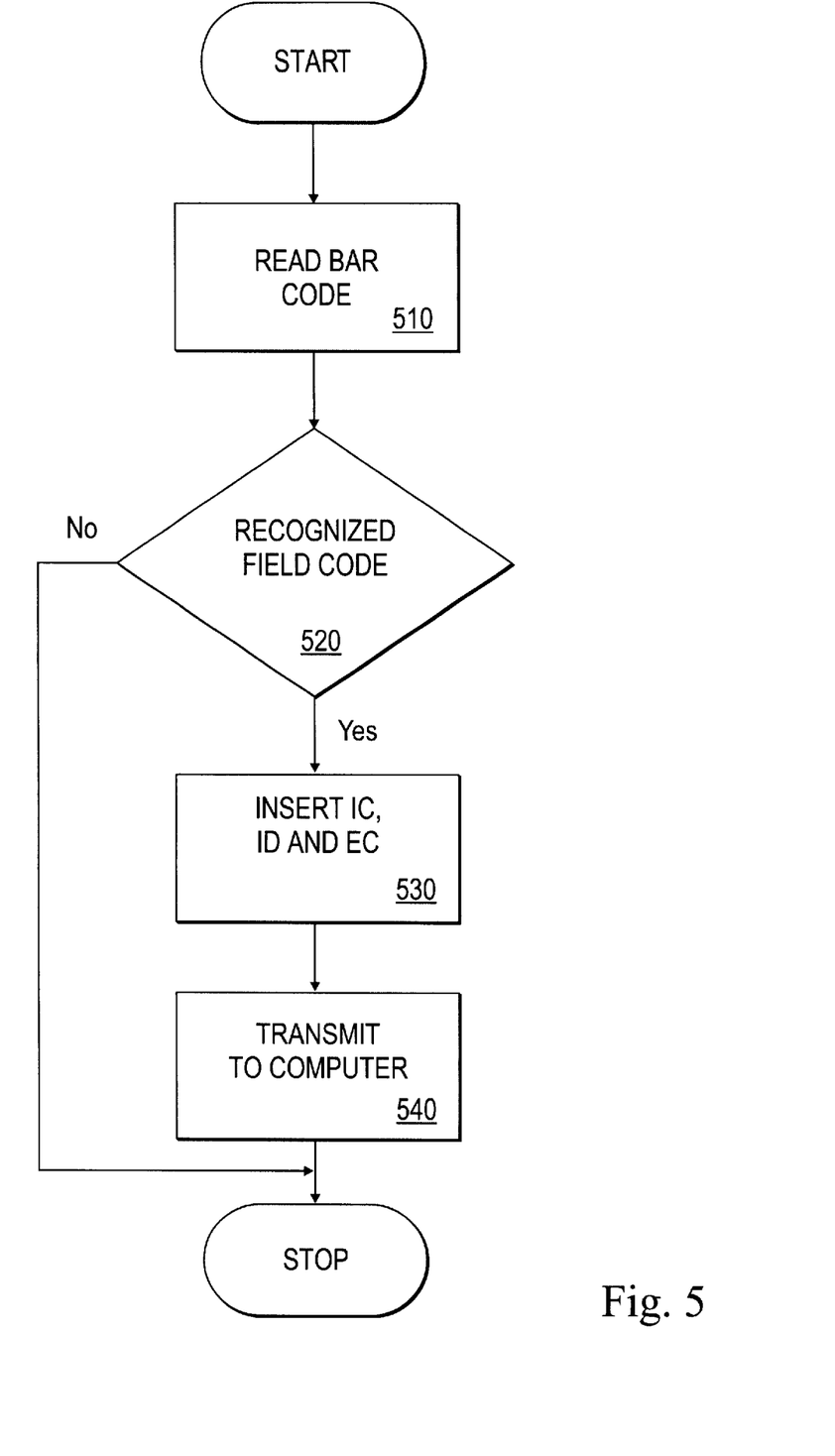
FIG. 5 is a flow diagram of the operation of a bar code reader in accordance with one embodiment of the present invention.

FIG. 5 illustrates an example of the operation of bar code reader 325. At step 510, a user reads a bar code using bar code reader 325. At step 520, it is determined whether the bar code that was read includes a recognizable fact field code. If the fact field code is not recognized, or the bar code does not include a fact field, the bar code is disregarded and operation is ceased. If the fact field code is recognized, IC, ID and TC are inserted into the bar code data string, step 530. At step 540, the data is transmitted to computer 305 via keyboard wedge 330.

Computer 305 is configure to listen for keystrokes received from keyboard wedge 330. Additionally, computer 305 carries out a specific action upon detecting a particular keystroke. Keystrokes received at computer 305 that originated at keyboard 320 are entered into data fields on monitor 310 based upon the location of the cursor. However, keystrokes that originated at bar code reader 325 are automatically entered into a data field corresponding with the fact field code included with the bar code data.

Figure 6:
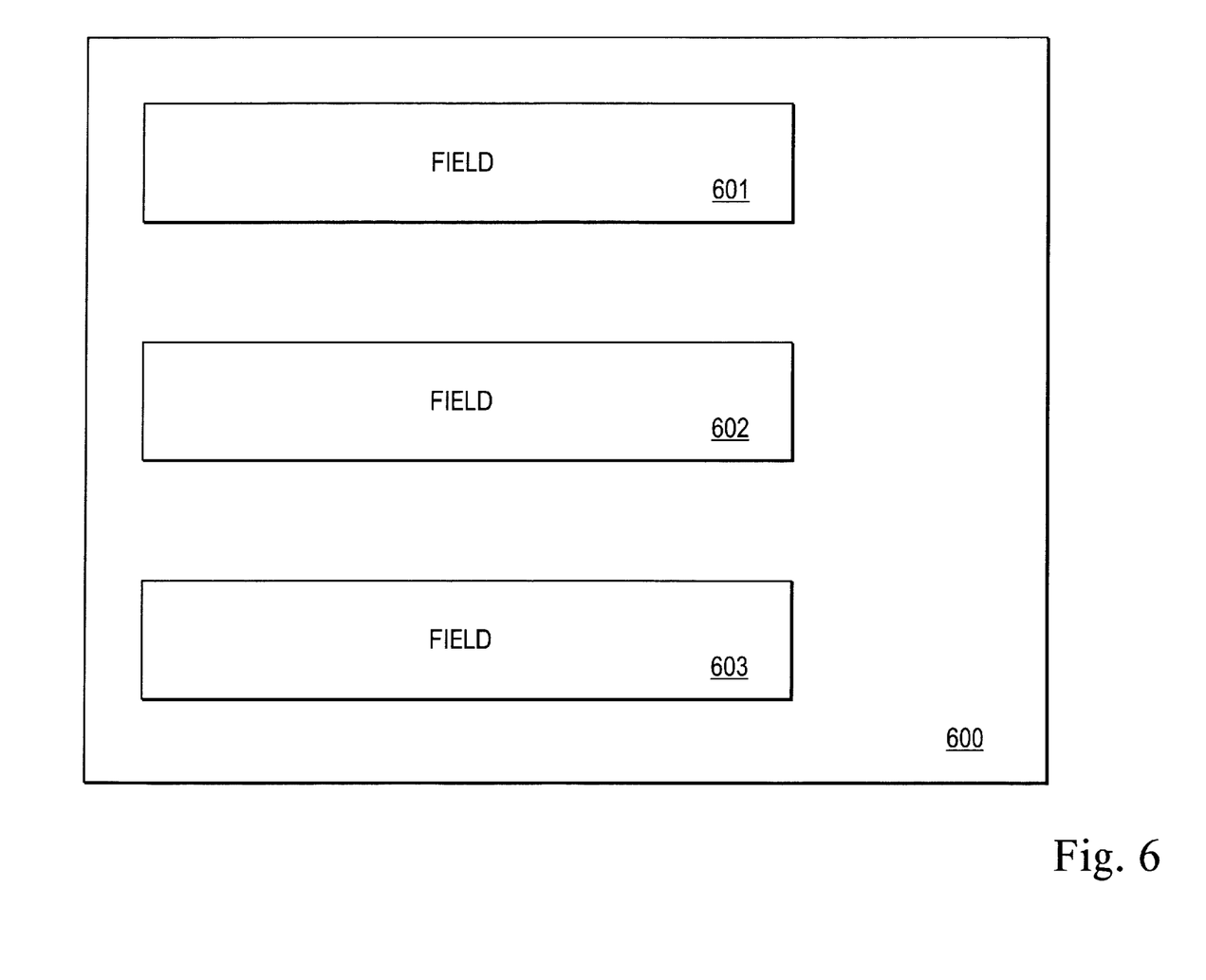
FIG. 6 illustrates an applications display for use in the system shown in FIG. 4.

FIG. 6 illustrates an applications display 600 for use with system 300. Display 600 is displayed on monitor 310 and includes data fields 601–603. Data field 601 may be used to enter information regarding the job number of a particular database entry, while data fields 602 and 603 may be used to enter location and operator name information, respectively. The user information may be entered into each of the data fields by keyboard 320 or bar code reader 325. Data may be entered into any of the data fields by using cursor controller 315 to place a cursor in the desired data field. For example, a system 300 user may enter job number data into field 201.

Data received from bar code reader 325 is processed by computer 305 and automatically entered into the pertinent data field. After data is received from bar code reader 325, the IC and TC codes are removed from the data string. In addition, the fact field code is removed and matched with the applicable data field destination. Finally, the bar code data is placed into the designated data field. No data appears in a data field until the data has been completely processed. Using bar code 400a as an example, computer 305 receives "//JOB/01000000000001//". The first "/" and the final "//" represent the IC and TC codes, respectively. "/JOB/" represents fact field code which indicates that the data is to be placed in data field 601 (i.e., the job number field), while the following "01" represents ID. "000000000001" represents data that is placed into data field 601.

According to one embodiment, computer 305 includes a timer that measures the delay between characters received from keyboard wedge 330. Data originating at bar code reader 325 is received by computer 305 at a substantially higher rate than data entered on keyboard 320. Thus, if the delay between the receipt of two characters at computer 305 is greater than a predetermined time interval, the characters are presumed to have originated from keyboard 320. Consequently, the characters are placed in the field where the cursor is located. According to a further embodiment, the timer may be programmable such that a system 300 user may select the predetermined time interval.

Figure 7:
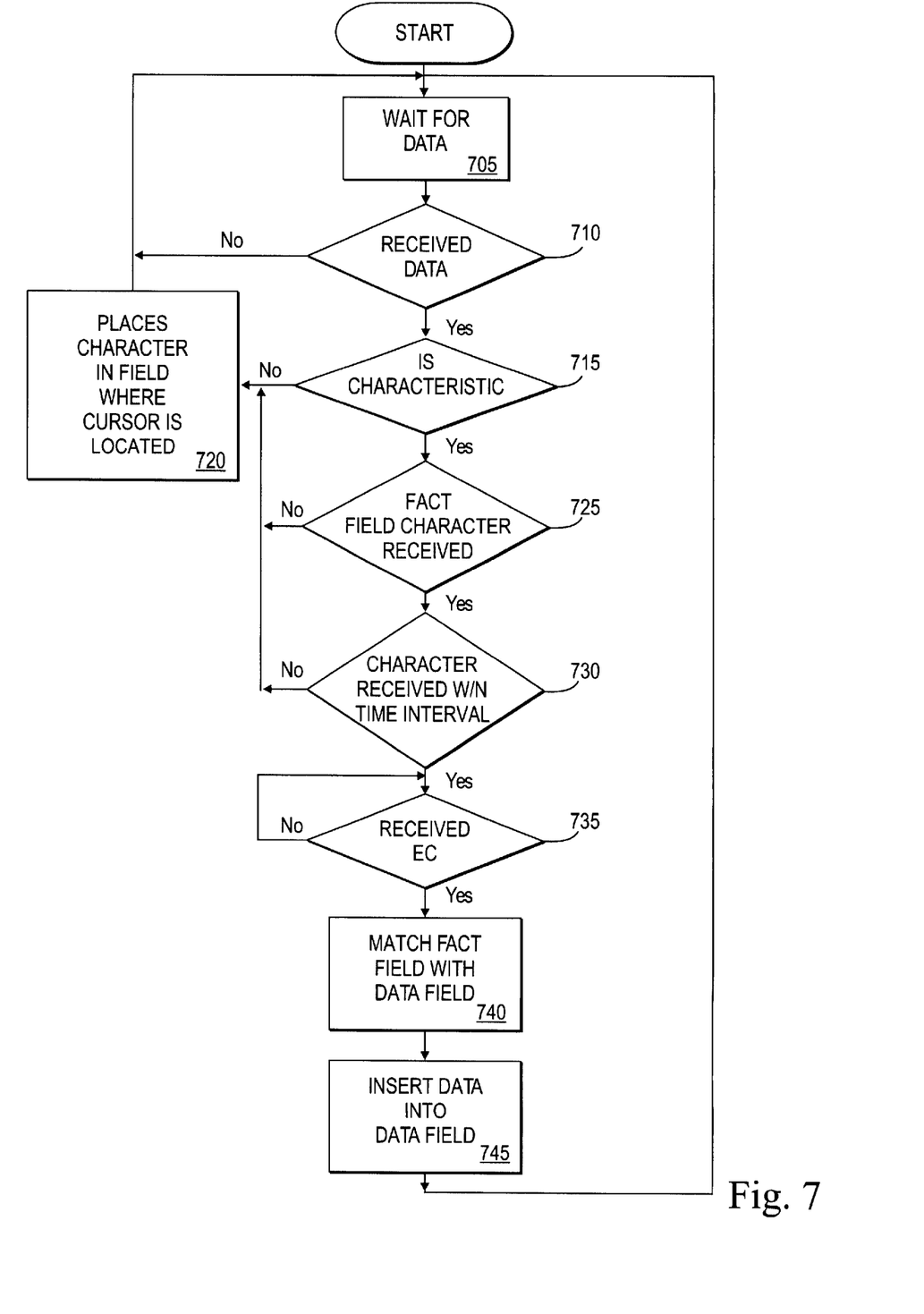
FIG. 7 is a flow diagram of the operation of a computer in accordance with one embodiment of the present invention.

FIG. 7 illustrates one example of the operation of computer 305. At step 705, computer 305 waits to receive data from keyboard 320 or bar code reader 325. At step 710, it is determined whether data has been received at computer 305. If data has not been received, control is returned back to step 705 and computer 305 waits for data. If data has been received at step 710, it is determined whether the received data was the initialization character (IC), step 715. If the data was not IC it is placed in a data field in which the cursor is located, step 720. Subsequently, control is returned back to step 705 wherein computer 305 waits for data.

If the received character was the IC, it is determined whether the next received character belongs to the fact field code (e.g., "/"), step 725. If the character does not belong to the fact field code, the previously received character was not the IC. In such an event, control is returned to step 720 wherein both characters are placed in a data field in which the cursor is located. Subsequently, control is returned back to step 705 wherein computer 305 waits for data. This condition may occur if a system user mistakenly types a character on keyboard 320 that coincides with IC.

If the character was in fact a part of the fact field code, it is determined whether the delay between receipt of the characters was less than a predetermined time interval, step 730. If the delay was greater than the predetermined time interval the previously received characters were received from keyboard 320. In this case, control is returned to step 720 wherein both characters are placed in a data field in which the cursor is located. Subsequently, control is returned back to step 705 wherein computer 305 waits for data. This condition may occur if a system user mistakenly types characters on keyboard 320 that coincides with IC and those of the fact field code.

If the characters were received within the predetermined time interval, it is determined whether the termination code (TC) has been received, step 735. If TC has not been received, the process remains in step 735 until it is received. If TC is received, the fact field code is matched with the applicable data field destination, step 740. At step 745, the received data is inserted into the applicable data field. Finally, control is returned back to step 705 wherein computer 305 waits for more data. Thus, a method and apparatus for automated data entry has been described.

What is claimed is:

1. A method comprising:
   receiving bar code data and determining whether initialization and field code characters have been received; and
   inserting the bar code data into a data field regardless of whether the data field is selected by a cursor if the initialization and field code characters were received within a predetermined time interval; otherwise inserting the characters into a data field determined by the location of the cursor.

2. The method of claim 1, further comprising determining whether a termination character has been received at the end of the bar code data.

3. The method of claim 2, further comprising:
   determining whether the bar code data includes a recognizable fact field code; and transmitting the bar code data.

4. The method of claim 3, wherein the bar code data is disregarded if no recognizable fact feild code is included.

5. The method of claim 3, further comprising:
   adding the initialization character to the bar code data after determining the bar code data includes a recognizable fact field code; and
   adding the termination character.

6. The method of claim 2, further comprising:
   extracting the initialization character from the bar code data;
   extracting the field code from the bar code data; and
   extracting the termination character from the bar code data.

7. A system comprising:
   a bar code reader configured to read bar code data from a bar code label and determine whether the bar code data includes initialization and field code characters; and
   a computer coupled to the bar code reader and configured to receive the bar code data from the bar code reader and automatically insert the bar code data into one of a plurality of data fields regardless of whether the data field is selected by a cursor if the initialization and field code characters included in the bar code data were received within a predetermined time interval and otherwise to insert the bar code data into another data field selected by a cursor.

8. The system of claim 7, wherein the bar code reader is further configured to disregard the bar code data if the bar code data does not include a recognizable fact field code.

9. The system of claim 7, wherein the bar code reader is further configured to transmit the bar code data to the computer if the bar code data includes a recognizable fact field code.

10. The system of claim 7, further comprising a keyboard wedge coupled between the computer and the bar code reader.

11. The system of claim 10, further comprising a keyboard coupled to the keyboard wedge.

12. The system of claim 7, wherein the bar code reader is further configured to transmit a termination character with the bar code data.

13. The system of claim 7, wherein the computer is configured to measure delay between received characters.

* * * * *